United States Patent
Kodama et al.

(10) Patent No.: US 12,517,201 B2
(45) Date of Patent: Jan. 6, 2026

(54) SUPERCONDUCTING MAGNET APPARATUS, MAGNETIC RESONANCE IMAGING APPARATUS, AND METHOD FOR DEMAGNETIZING SUPERCONDUCTING MAGNET

(71) Applicant: HITACHI, LTD., Tokyo (JP)

(72) Inventors: Motomune Kodama, Tokyo (JP); Yota Ichiki, Tokyo (JP); Shinji Fujita, Tokyo (JP)

(73) Assignee: HITACHI, LTD., Tokyo (JP)

( * ) Notice: Subject to any disclaimer, the term of this patent is extended or adjusted under 35 U.S.C. 154(b) by 362 days.

(21) Appl. No.: 18/267,504

(22) PCT Filed: Dec. 23, 2021

(86) PCT No.: PCT/JP2021/047912
§ 371 (c)(1),
(2) Date: Jun. 15, 2023

(87) PCT Pub. No.: WO2022/168483
PCT Pub. Date: Aug. 11, 2022

(65) Prior Publication Data
US 2024/0045009 A1    Feb. 8, 2024

(30) Foreign Application Priority Data
Feb. 2, 2021    (JP) .................. 2021-015019

(51) Int. Cl.
*G01R 33/3815*    (2006.01)
*G01R 33/28*    (2006.01)
*G01R 33/38*    (2006.01)

(52) U.S. Cl.
CPC ....... *G01R 33/3815* (2013.01); *G01R 33/288* (2013.01); *G01R 33/3804* (2013.01)

(58) Field of Classification Search
CPC .............. G01R 33/3815; G01R 33/288; G01R 33/3804; A61B 5/055; H01F 5/00; H01F 6/04; H01F 6/06
See application file for complete search history.

(56) References Cited

U.S. PATENT DOCUMENTS

2005/0248350 A1    11/2005   Tsuda et al.
2013/0147485 A1    6/2013    Yokoi
(Continued)

FOREIGN PATENT DOCUMENTS

CN    106098291 A    11/2016
JP    61-007610 A    1/1986
(Continued)

OTHER PUBLICATIONS

B. Fridman et al., "Capacitor bank for Fast Discharge Unit of iter facility," 2011 IEEE Pulsed Power Conference, Chicago, IL, USA, 2011, pp. 1536-1541 (Year: 2011).*

(Continued)

*Primary Examiner* — Daniel R Miller
(74) *Attorney, Agent, or Firm* — MATTINGLY & MALUR, PC (57) ABSTRACT

A superconducting magnet apparatus includes a superconducting coil, a persistent current switch, a cryostat, an external resistance element that attenuates energy accumulated in the superconducting coil when the superconducting coil is demagnetized, an external power supply capable of energizing a reverse current of a persistent current to the superconducting coil, and a circuit breaker capable of freely cutting off energization between the external power supply and the superconducting coil. A method for demagnetizing a superconducting magnet includes causing the reverse current of the persistent current to flow from the external power supply, and switching the persistent current switch to an off-state and switching the circuit breaker to an off-state, (Continued)

and demagnetizing the superconducting magnet by causing a current flowing through the superconducting coil to flow to an external resistance element when the amount of current flowing through the persistent current switch decreases.

12 Claims, 5 Drawing Sheets

(56) References Cited

U.S. PATENT DOCUMENTS

| | | | |
|---|---|---|---|
| 2015/0255977 A1 | 9/2015 | Jonas et al. | |
| 2022/0016442 A1* | 1/2022 | Slade | H01F 6/006 |

FOREIGN PATENT DOCUMENTS

| | | |
|---|---|---|
| JP | 63-012113 A | 1/1988 |
| JP | 10-177900 A | 6/1998 |
| JP | 2004-141412 A | 5/2004 |
| JP | 2010-147370 A | 7/2010 |
| JP | 2011-015841 A | 1/2011 |
| JP | 2013-144099 A | 7/2013 |
| JP | 2015-535709 A | 12/2015 |
| JP | 2016-119431 A | 6/2016 |
| JP | 2018-060926 A | 4/2018 |
| JP | 2018-086037 A | 6/2018 |
| JP | 6457941 B2 | 1/2019 |
| WO | 2018/066326 A1 | 4/2018 |
| WO | WO-2021131178 A1 * | 7/2021 ............ H01F 6/006 |

OTHER PUBLICATIONS

J. W. Bray, M. Parizh, M. Xu and A. Wu, "Quench Protection Optimization of Multi-Coil LTS Magnets," in IEEE Transactions on Applied Superconductivity, vol. 30, No. 4, pp. 1-5, Jun. 2020 (Year: 2020).*

Chapter 3, High Magnetic Fields. Institute of Electronics, Information and Communication Engineers (IEICE) "Knowledge Base", Group 9, (Electronic Materials and Devices)—Part 10 (Vacuum, Low Temperature and High Magnetic Field Technologies), IEICE, May 20, 2019, pp. 1-5, 3-1-1 (1) Superconducting Wire.

Power supply system for LHD superconducting coil excitation, Teion Kogaku (J.Cryo.Super.Soc.Jpn.) vol. 53, No. 3, (2018).

International Search Report of PCT/JP2021/047912 dated Feb. 1, 2022.

* cited by examiner

SUPERCONDUCTING MAGNET APPARATUS, MAGNETIC RESONANCE IMAGING APPARATUS, AND METHOD FOR DEMAGNETIZING SUPERCONDUCTING MAGNET

TECHNICAL FIELD

The present invention relates to a superconducting magnet apparatus having a demagnetization mechanism for demagnetizing a superconducting magnet, a magnetic resonance imaging apparatus including the superconducting magnet apparatus, and a method for demagnetizing a superconducting magnet for demagnetizing a superconducting magnet operated in a persistent current mode.

BACKGROUND ART

Magnetic resonance imaging (MRI) apparatuses are used for image diagnosis in a medical field, and are indispensable tools for diagnosis of pathological conditions. The MRI apparatus is an apparatus utilizing a strong static magnetic field generated by a superconducting magnet, and is operated in a persistent current mode. The persistent current mode is an operation mode in which a superconducting current that is not substantially attenuated flows through a closed circuit formed by a superconducting coil to generate a magnetic field.

In a superconducting magnet apparatus such as the MRI apparatus, a persistent current switch (PCS) is connected in parallel to the superconducting coil. A superconducting wire material having a superconducting filament serving as a superconductor at a critical temperature or lower as a core wire is used for the superconducting coil and the persistent current switch. The superconducting coil and the persistent current switch are connected in a superconductive manner to be energizable with a substantially zero resistance.

The persistent current switch is an element capable of switching between a high resistance state (off-state) and a zero resistance state (on-state), and is used to switch the operation mode from a power supply drive mode to a persistent current mode. A thermal type persistent current switch includes a superconducting wire material wound around a bobbin or the like, and a heater that heats the superconducting wire material at the time of switching the operation mode. The persistent current switch is turned on in a case where the superconducting wire material is cooled to a critical temperature or lower, and is turned off in a case where the superconducting wire material is heated to a normal conduction state.

In the power supply drive mode in which an operation of the superconducting magnet apparatus is started, the persistent current switch is turned off, and a current is caused to flow from a power supply to the superconducting coil to excite the superconducting coil. In a subsequent persistent current mode, the persistent current switch is turned on, the current from the power supply is reduced, and the superconducting current is caused to flow in a closed circuit formed by the superconducting coil and the persistent current switch. The superconducting current flowing in the closed circuit becomes a persistent current that is energized with a substantially zero resistance, and generates a stable static magnetic field.

In the related art, niobium titanium (NbTi) is used for a superconducting wire material forming the superconducting coil or the like in commercially available MRI apparatuses. In general, the superconducting coil or the like using niobium titanium is cooled by liquid helium. An inside of the cryostat is filled with 1500 L to 2000 L of liquid helium. The liquid helium is continuously cooled by a Gifford-MacMahon (GM) refrigerator or the like.

The liquid helium filled in the cryostat plays an important role not only in uniformly cooling the superconducting coil and the like but also in ensuring reliability of the superconducting magnet apparatus. Liquid helium cooled to an extremely low temperature has an effect of continuously cooling the superconducting coil or the like even at the time of power failure in which power to the refrigerator is stopped or at the time of cooling failure due to malfunction or the like of the refrigerator.

In addition, the general superconducting magnet apparatus including the MRI apparatus or the like includes an urgent demagnetization mechanism that rapidly demagnetizes the superconducting magnet in order to urgently stop the apparatus at the time of an accident, a disaster, or the like. In general, at the time of urgent demagnetization, it is necessary to lower a central magnetic field to about 0.02 T or less within several tens of seconds to several minutes. Thus, in the superconducting magnet apparatus of the related art, the superconducting coil or the like is heated to be forcibly quenched. The liquid helium filled in the cryostat is vaporized by heating at the time of such urgent demagnetization and is vented to the outdoors or the like, but has an action of cooling the inside of the cryostat by latent heat of vaporization at the time of vaporization.

In a cooling system using liquid helium, since a temperature rise inside the cryostat can be suppressed by an action of liquid helium, it is possible to obtain an additional time to solve the problem. Since the superconducting coil and the persistent current switch are maintained at a low temperature even though the apparatus is stopped, the superconducting coil and the persistent current switch can be quickly restored when restart is required.

However, in recent years, helium has become difficult to obtain, and the price has increased. In the cooling system using liquid helium, since liquid helium vaporizes and decreases at the time of the demagnetization of the superconducting magnet, refilling of liquid helium is required after demagnetization, but refilling requires a large amount of cost. Under such circumstances, a cooling system that does not use liquid helium and a cooling system that reduces the amount of used liquid helium are being developed.

Superconducting magnet apparatuses including a thermosiphon type cooling mechanism have been developed, and some of the superconducting magnet apparatuses have been commercialized as a technique for reducing the amount of used liquid helium. An MRI apparatus including a general thermosiphon type cooling mechanism is filled with several L to several tens L of liquid helium. According to the thermosiphon type, since heat convection due to gravity is used, high cooling capacity can be obtained even with a small amount of liquid helium. In addition, since the liquid helium is completely sealed, the refilling of the liquid helium after demagnetization becomes unnecessary.

In the cooling system not using liquid helium or the cooling system that reduces the amount of used liquid helium, since the action of liquid helium cannot be sufficiently obtained, some problems remain. In a case where the amount of used liquid helium is small, since the temperature rise inside the cryostat rapidly proceeds at the time of loss of cooling, quenching occurs in the superconducting coil or the like, and a further temperature rise due to Joule heat proceeds. In addition, in a case where the amount of used liquid helium is small, since the liquid helium cannot be refilled, it takes more time to re-cool the superconducting coil and the like at the time of restoration.

In relation to such a problem associated with the demagnetization of the superconducting magnet, PTL 1 describes a superconducting permanent magnet device including an energy dump unit. In this apparatus, in a case where malfunction that may cause quenching is detected, the energy dump unit is connected in parallel with a conductive coil, energy is transferred from the conductive coil to the energy dump unit, and the energy is dispersed outside the cryostat.

In addition, in recent years, magnesium diboride ($MgB_2$) and high-temperature superconductors have been put to practical use. These superconductors have a high critical temperature, a critical temperature of $MgB_2$ is about 40 K, a critical temperature of rare earth-based copper oxide is about 90 K, and a critical temperature of bismuth-based copper oxide is about 110 K. According to $MgB_2$ and the high-temperature superconductor, since a superconductive state can be maintained up to a higher temperature than niobium titanium of the related art, it is expected that cooling by liquid helium becomes unnecessary.

A superconducting wire material using $MgB_2$ or a high-temperature superconductor has a feature that an energy tolerance is larger than in a case where the niobium titanium of the related art is used. An energy tolerance $\Delta e$ is expressed by the following Equation (1), where an operation temperature is defined as $T_{op}$, a composite heat capacity combined for a superconducting wire material which is a composite material of a core and a sheath is defined as $C_p$, and an upper limit temperature at which a rated current can be energized with a zero resistance is defined as $T_1$.

[Math. 1]

$$\Delta e = \int_{T_{op}}^{T_1} C_p dT \quad (1)$$

The energy tolerance $\Delta e$ is about 1 $kJm^{-3}$ in the case of niobium titanium. In contrast, in the case of $MgB_2$ or the high-temperature superconductor, the energy tolerance is 10 to 10000 times as large as $MgB_2$. In the case of niobium titanium, quenching easily occurs in a case where heat generation occurs due to various losses, whereas in the case of $MgB_2$ or the high-temperature superconductor, quenching hardly occurs.

CITATION LIST

Non-Patent Literature

PTL 1: JP 6457941 B

SUMMARY OF INVENTION

Technical Problem

As described in PTL 1, when the superconducting magnet is demagnetized, the energy of the superconducting coil is consumed outside the cryostat, and thus, the temperature rise inside the cryostat can be suppressed. As a demagnetization mechanism that consumes the energy of the superconducting coil, it is conceivable to provide a protective resistor or the like outside the cryostat. In a case where the temperature rise inside the cryostat is suppressed, since the superconducting coil and the like are maintained at a low temperature, the time required for re-cooling is shortened, and the superconducting magnet apparatus can be restored at an early stage.

However, the demagnetization method of consuming the energy of the superconducting coil outside the cryostat is effective in a case where there is a time margin for demagnetization of the superconducting magnet, such as the time of power failure in which power to the refrigerator is stopped or the time of cooling failure due to malfunction or the like of the refrigerator, but there is still a problem in application in a case where there is no time margin, such as an attraction accident in which a magnetic body is attracted to the superconducting magnet apparatus.

For example, in the superconducting magnet apparatus using the superconducting wire material using the niobium titanium of the related art, even though an attempt is made to rapidly demagnetize the superconducting magnet, since the superconducting wire material is quenched, it is difficult to perform urgent demagnetization to immediately stop the apparatus. In the case of the superconducting wire material using the niobium titanium, when the magnetic field is rapidly lowered, since an AC loss occurs, the temperature rises and quenching is likely to occur.

When the quenching of the superconducting coil or the like occurs, since heat generation due to Joule heat occurs inside the cryostat, re-cooling is required for restarting the apparatus, and the time required for restoration becomes long as in the demagnetization method for heating and forcibly quenching the superconducting coil or the like. In addition, in a case where the quenching occurs, there is a concern that burnout of the superconducting wire material leading to disconnection or explosive vaporization of liquid helium leading to an accident or damage of the cryostat occurs. That is, in the demagnetization method of the related art, since the restriction of a demagnetization rate is still large, it is difficult to obtain an advantage as compared with the demagnetization method for heating and forcibly quenching the superconducting coil or the like.

The energy tolerance $\Delta e$ of the superconducting wire material forming the superconducting coil or the like is related to the restriction of the demagnetization rate. In a case where the energy tolerance $\Delta e$ is small, the time margin at the time of loss of cooling is reduced. In addition, in the cryostat, since heat is generated due to loss during rapid demagnetization, quenching is likely to occur. Since the technique described in PTL 1 assumes a case where there is a time margin such as loss of power, there is a high possibility that it cannot be applied to rapid demagnetization.

Therefore, an object of the present invention is to provide a superconducting magnet apparatus capable of rapidly demagnetizing a superconducting magnet by suppressing the amount of generated heat inside a cryostat, a magnetic resonance imaging apparatus including the superconducting magnet apparatus, and a method for demagnetizing a superconducting magnet using the superconducting magnet apparatus.

Solution to Problem

In order to solve the above problems, a superconducting magnet apparatus according to the present invention includes a superconducting coil that forms a superconducting magnet, a persistent current switch that forms a closed circuit in which a persistent current flows together with the superconducting coil, a cryostat that houses the superconducting coil and the persistent current switch, an external resistance element that is connected in parallel with the superconducting coil, is disposed outside the cryostat, and attenuates energy accumulated in the superconducting coil when the superconducting coil is demagnetized, an external power supply that is connected in parallel with the superconducting coil, is disposed outside the cryostat, and is able to energize a reverse current of the persistent current to the closed circuit, and a circuit breaker that is connected in series with the power supply, and is able to freely cut off energization between the external power supply and the superconducting coil. When the superconducting magnet is demagnetized, the reverse current of the persistent current is caused to flow from the external power supply to the closed circuit, and when an amount of current flowing through the persistent current switch is decreased, the persistent current switch is switched to an off-state and the circuit breaker is switched to an off-state, and the superconducting magnet is demagnetized by causing a current flowing through the superconducting coil to flow to the external resistance element in a closed circuit formed by the superconducting coil and the external resistance element.

In addition, the magnetic resonance imaging apparatus according to the present invention includes the superconducting magnet apparatus.

In addition, a method for demagnetizing a superconducting magnet according to the present invention, a method for demagnetizing a superconducting magnet for demagnetizing a superconducting magnet operated in a persistent current mode includes, in a superconducting magnet that includes a superconducting coil forming a superconducting magnet, a persistent current switch forming a closed circuit in which a persistent current flows together with the superconducting coil, a cryostat housing the superconducting coil and the persistent current switch, an external resistance element connected in parallel with the superconducting coil, disposed outside the cryostat, and attenuating energy accumulated in the superconducting coil when the superconducting coil is demagnetized, an external power supply connected in parallel with the superconducting coil, disposed outside the cryostat, and able to energize a reverse current of the persistent current to the closed circuit, and a circuit breaker connected in series with the power supply, and able to freely cut off energization between the external power supply and the superconducting coil, causing the reverse current of the persistent current to flow from the external power supply to the closed circuit when the superconducting magnet is demagnetized, and switching the persistent current switch to an off-state and switching the circuit breaker to an off-state, and demagnetizing the superconducting magnet by causing a current flowing through the superconducting coil to flow to the external resistance element in a closed circuit formed by the superconducting coil and the external resistance element, when an amount of current flowing through the persistent current switch decreases.

Advantageous Effects of Invention

According to the present invention, it is possible to provide a superconducting magnet apparatus capable of suppressing the amount of generated heat inside a cryostat and rapidly demagnetizing a superconducting magnet, a magnetic resonance imaging apparatus including the superconducting magnet apparatus, and a method for demagnetizing a superconducting magnet using the superconducting magnet apparatus.

DESCRIPTION OF EMBODIMENTS

Hereinafter, a superconducting magnet apparatus according to an embodiment of the present invention, a magnetic resonance imaging apparatus including the superconducting magnet apparatus, and a method for demagnetizing a superconducting magnet using the superconducting magnet apparatus will be described with reference to the drawings. Note that, in the following drawings, common components are denoted by identical reference signs, and redundant description will be omitted.

Figure 1:
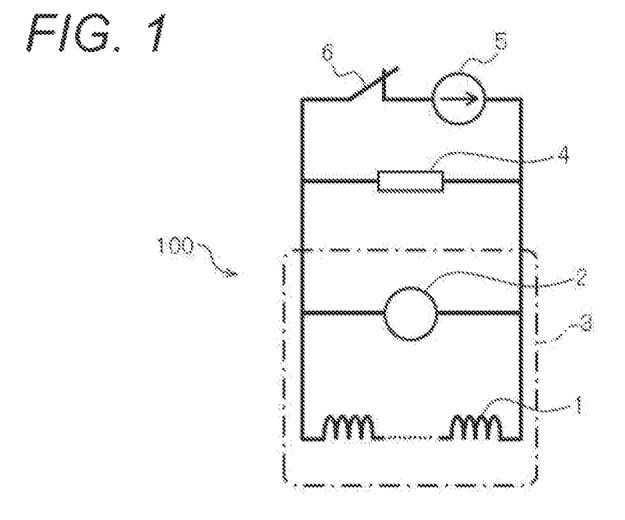
FIG. 1 is a diagram illustrating an equivalent circuit of a superconducting magnet apparatus according to an embodiment of the present invention.

FIG. 1 is a diagram illustrating an equivalent circuit of a superconducting magnet apparatus according to the embodiment of the present invention.

As illustrated in FIG. 1, a superconducting magnet apparatus 100 according to the present embodiment is a device that generates a magnetic field by a superconducting magnet, and includes superconducting coils 1, a persistent current switch 2, a cryostat 3, an external resistance element 4, an external power supply 5, and a circuit breaker 6.

In a case where a persistent current flows in a superconductive state of a transition temperature or lower, the superconducting coils 1 generate a static magnetic field (static magnetic field) with little time variation. The plurality of superconducting coils 1 are connected to each other in a superconductive manner in series. The superconducting coil 1 is formed by winding a superconducting wire material in a coil shape. The superconducting wire material for a superconducting coil is provided with a superconducting filament that transitions to a superconductor state at an extremely low temperature as a core wire.

Note that, in FIG. 1, the superconducting magnet apparatus 100 includes the plurality of superconducting coils 1, but the number of superconducting coils 1 is not particularly limited. The number of superconducting coils 1 can be, for example, eight or the like.

The persistent current switch 2 is formed as, for example, a thermal switching element. The thermal persistent current switch 2 includes a superconducting wire material wound around a bobbin or the like, and a heater for heating the superconducting wire material. The superconducting wire material for a persistent current switch is provided with a superconducting filament that transitions to a superconductor state at an extremely low temperature as a core wire. The bobbin can be made of, for example, copper. A superconducting wire material is wound around the bobbin without induction winding, and is impregnated with an insulating resin.

The persistent current switch 2 is connected to both terminals of a coil group constituted by the superconducting coils 1 in a superconductive manner. The persistent current switch 2 forms a closed circuit capable of energizing with a substantially zero resistance in the superconductive state together with the superconducting coils 1. In a case where the thermal persistent current switch 2 is heated by the heater, the thermal persistent current switch is switched from an on-state that is a zero resistance to an off-state that indicates a resistance.

The cryostat 3 is provided as a heat-insulating container, and includes a vacuum container, a thermal radiation shield, and the like. The superconducting coils 1 and the persistent current switch 2 are housed inside the cryostat 3. During an operation of the superconducting magnet apparatus 100, an inside of the cryostat 3 is cooled to a temperature equal to or lower than a critical temperature of a superconductor used for the superconducting coils 1 and the persistent current switch 2 in order to cause an operation current to flow to the superconducting coil 1 with a substantially zero resistance.

The cryostat 3 can be cooled, for example, by conduction cooling by a Gifford-McMahon (GM) refrigerator. In order to uniformly and efficiently cool the superconducting coils 1 and the persistent current switch 2 between the refrigerator and the superconducting coils 1 and between the refrigerator and the persistent current switch 2 inside the cryostat 3, it is possible to provide a heat transfer path to which high purity copper or the like having high thermal conductivity is connected.

Liquid helium may or may not be used for cooling the cryostat 3. A thermosiphon type using a small amount of liquid helium of about 10 L is used preferably as a cooling system using liquid helium. In a case where the cooling system in which the amount of used liquid helium is reduced is used, a temperature rise inside the cryostat can be suppressed at the time of power failure or loss of cooling due to malfunction of the refrigerator while the cost is suppressed at the time of operation or restoration.

The external resistance element 4 is a resistance element that converts electric energy into thermal energy, and attenuates energy accumulated in the superconducting coils 1 in a case where the superconducting coils 1 are demagnetized. The external resistance element 4 is connected in parallel with the superconducting coil 1 and is disposed outside the cryostat 3. The external resistance element 4 is connected to a closed circuit formed by the superconducting coils 1 and the persistent current switch 2 via a conducting wire which is a normal conductor disposed outside the cryostat 3.

In the external resistance element 4, when the superconducting coils 1 are demagnetized, in a case where the persistent current switch 3 is switched to the off-state, a current flows from the superconducting coils 1. In the external resistance element 4, energy accumulated in the superconducting coils 1 is consumed as Joule heat or the like. A solid resistor using metal or the like, a liquid resistor using a conductive liquid, or the like can be used as the external resistance element 4.

The external power supply 5 is a DC power supply that supplies power to the superconducting coils 1 and the like, and when the superconducting coils 1 are demagnetized, a reverse current of a persistent current can be energized to the closed circuit formed by the superconducting coils 1 and the persistent current switch 2. The external power supply 5 is connected in parallel with the superconducting coils 1 and the external resistance element 4, and is disposed outside the cryostat 3. The external power supply 5 is connected to the closed circuit formed by the superconducting coils 1 and the persistent current switch 2 via the conducting wire which is the normal conductor disposed outside the cryostat 3.

When the superconducting coils 1 are demagnetized, the external power supply 5 energizes the reverse current to the closed circuit formed by the superconducting coils 1 and the persistent current switch 2, and decreases a current flowing through the persistent current switch 2 by applying a negative voltage. Although the external power supply 5 is used at least when the superconducting coils 1 are demagnetized, the external power supply may be used both at the time of demagnetization and at the time of excitation of the superconducting coil 1 by having both a reverse current energization function and an excitation current energization function. Alternatively, an excitation power supply used at the time of excitation may be individually provided in addition to the external power supply 5 used at the time of demagnetization.

The circuit breaker 6 is a device that opens and closes a current circuit, and can freely cut off energization between the external power supply 5 and the superconducting coils 1. The circuit breaker 6 is connected in parallel with the superconducting coils 1 and is connected in series with the external power supply 5, and is disposed outside the cryostat 3. In a case where the circuit breaker 6 is closed, the external power supply 5 used for energizing the reverse current can be electrically disconnected from the superconducting coils 1 and the external resistance element 4. Various types such as a vacuum circuit breaker, a pneumatic circuit breaker, an oil-filled circuit breaker, and a gas circuit breaker can be used as the circuit breaker 6.

FIG. 2 is a diagram illustrating a flow of the method for demagnetizing the superconducting magnet according to the embodiment of the present invention. FIG. 2A is a diagram illustrating a persistent current mode of the superconducting magnet. FIG. 2B is a diagram illustrating a transition mode (persistent current switch on-state) performed at the time of demagnetization of the superconducting magnet. FIG. 2C is a diagram illustrating a transition mode (persistent current switch off-state) performed at the time of demagnetization of the superconducting magnet. FIG. 2D is a diagram illustrating a demagnetization mode performed when the superconducting magnet is demagnetized.

Figure 2A:
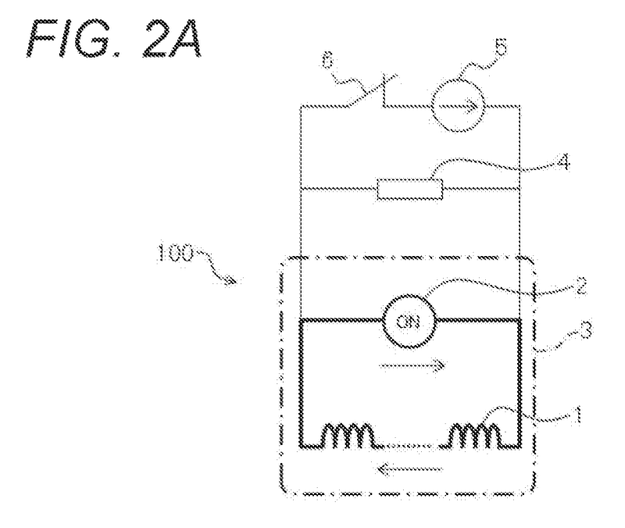
FIG. 2A is a diagram illustrating a persistent current mode of a superconducting magnet.
Figure 2B:
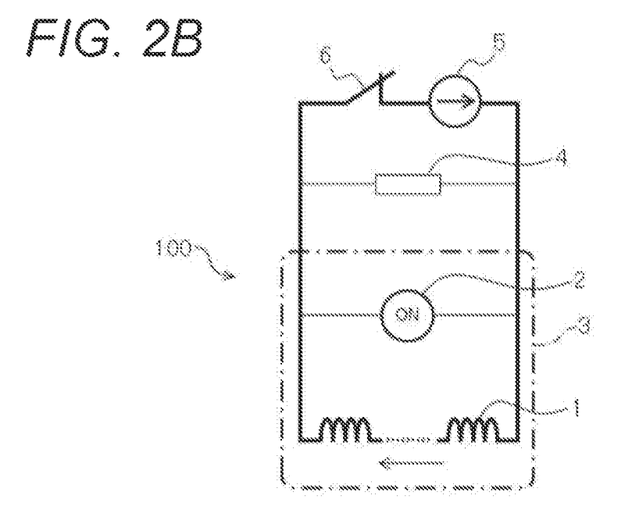
FIG. 2B is a diagram illustrating a transition mode (persistent current switch on-state) performed at the time of demagnetization of the superconducting magnet.
Figure 2C:
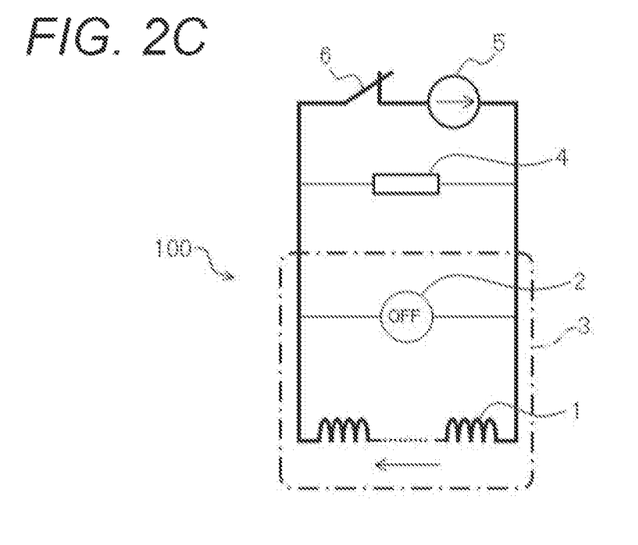
FIG. 2C is a diagram illustrating a transition mode (persistent current switch off-state) performed at the time of demagnetization of the superconducting magnet.

In FIGS. 2A to 2C, a thick solid line indicates a main circuit through which a large current flows, and a thin solid line indicates a circuit through which a current smaller than in the main circuit flows, or a circuit in which energization is cut off.

Figure 2D:
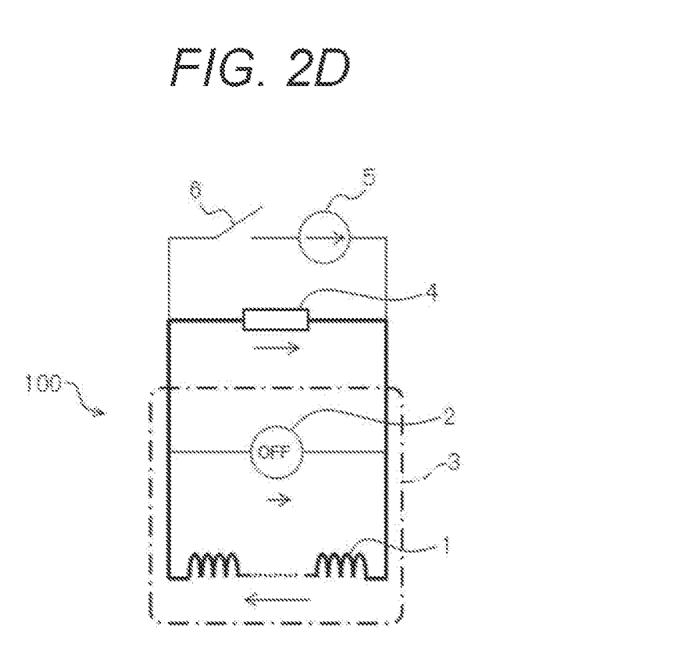
FIG. 2D is a view illustrating a demagnetization mode performed at the time of demagnetization of the superconducting magnet.

In the superconducting magnet apparatus 100, when the superconducting coils 1 operating in the persistent current mode are demagnetized, energization is controlled in the order from FIG. 2A to FIG. 2B, from FIG. 2B to FIG. 2C, and from FIG. 2C to FIG. 2D. The circuit disposed inside the cryostat 3 can be energized with a substantially zero resistance at an extremely low temperature equal to or lower than the critical temperature of the superconductor used for the superconducting coils 1 and the persistent current switch 2. The circuit disposed outside the cryostat 3 is made of a normal conductor such as copper.

As illustrated in FIG. 2A, in the persistent current mode, a persistent current that is not substantially attenuated flows in the closed circuit formed by the superconducting coils 1 and the persistent current switch 2. The superconducting coils 1 generate a strong static magnetic field by the energization of the persistent current. In the persistent current mode, the external resistance element 4 and the external power supply 5 disposed outside the cryostat 3 are electrically disconnected from the closed circuit by a conducting wire made of a high-resistance normal conductor.

As illustrated in FIG. 2B, in the demagnetization method according to the present embodiment, when the superconducting magnet is demagnetized, the operation in the transition mode is started before the persistent current switch 2 is switched to the off-state. In the transition mode, the reverse current of the persistent current flows from the external power supply 5 to the superconducting coils 1. In a case where the reverse current of the persistent current flows in the closed circuit formed by the superconducting coils 1 and the persistent current switch 2, the negative voltage is applied to the superconducting coils 1 and the persistent current switch 2, and the current flowing through the persistent current switch 2 decreases.

The reverse current by the external power supply 5 is preferably controlled to a predetermined current increase rate per unit time in accordance with a time margin allowed at the time of demagnetization of the superconducting magnet to increase the current from zero. In addition, the reverse current is preferably increased until the amount of current flowing through the persistent current switch 2 decreases to the allowable amount of current or less in the off-state of the persistent current switch 2. Note that, the allowable amount of current of the persistent current switch 2 can be set within a range in which the superconducting wire material is not disconnected due to burnout in accordance with a wire diameter, a wire length, an electric resistance, and a required maximum demagnetization rate of the superconducting wire material forming the persistent current switch 2.

Subsequently, as illustrated in FIG. 2C, when the amount of current flowing through the persistent current switch 2 decreases, the persistent current switch 2 is switched to the off-state. The switching of the persistent current switch in the transition mode is preferably performed when the amount of current flowing through the persistent current switch 2 decreases to the allowable amount of current in the off-state of the persistent current switch 2 or less. In a case where the persistent current switch 2 is switched to the off-state, the persistent current switch 2 is in the normal conduction state, and current flows through the external resistance element 4 having a resistance lower than an off-resistance of the persistent current switch 2.

Subsequently, as illustrated in FIG. 2D, after the persistent current switch 2 is switched to the off-state, the circuit breaker 6 is switched to the off-state to start the operation in the demagnetization mode. In the demagnetization mode, after the circuit breaker 6 is switched to the off-state, in the closed circuit formed by the superconducting coils 1 and the external resistance element 4, the current flowing through the superconducting coils 1 is caused to flow through the external resistance element 4 to attenuate the energy accumulated in the superconducting coils 1. In a case where the circuit breaker 6 is switched to the off-state, the external power supply 5 is electrically disconnected from the closed circuit formed by the superconducting coils 1 and the external resistance element 4.

In the demagnetization mode, the current flowing through the superconducting coils 1 is shunt to the external resistance element 4 and the persistent current switch 2 in the off-state in accordance with a relationship between the resistance of the external resistance element 4 and the off-resistance of the persistent current switch 2. In the external resistance element 4, since current energy is consumed as Joule heat or the like, the energy accumulated in the superconducting coils 1 can be attenuated to demagnetize the superconducting magnet. The amount of current shunt to the persistent current switch 2 decreases by the reverse current supplied from the external power supply 5, and further decreases at a shunt ratio according to the relationship between the resistance of the external resistance element 4 and the off-resistance of the persistent current switch 2.

According to the superconducting magnet apparatus 100 and the method for demagnetizing the superconducting magnet, when the superconducting magnet is demagnetized, since the transition mode is executed before the demagnetization mode, the current flowing through the persistent current switch 2 can be decreased. Thus, it is possible to demagnetize the superconducting magnet more rapidly than in the related art within a range in which quenching in the superconducting coils 1 or the persistent current switch 2, burnout of the superconducting wire material, or the like does not occur. Since the demagnetization can be performed more rapidly than in the related art by appropriate design of the superconducting wire material forming the persistent current switch 2 and the external power supply 5, a restoration time can also be shortened.

The method for demagnetizing the superconducting magnet illustrated in FIG. 2 can be used at the time of urgent demagnetization in which the superconducting magnet apparatus 100 is to be immediately stopped, such as the time of power failure in which power to the refrigerator is stopped, the time of cooling failure due to malfunction or the like of the refrigerator, or the time of attraction accident in which a magnetic body is attracted to the superconducting magnet apparatus. For example, the superconducting magnet apparatus 100 can be provided such that an operator starts demagnetization processes by operating a switch or the like. The demagnetization processes of the transition mode and the demagnetization mode can be controlled in sequence.

The persistent current switch 2, the external power supply 5, and the circuit breaker 6 preferably include an uninterruptible power supply device that supplies power necessary for the operation at the time of power failure. In a case where the uninterruptible power supply device is provided as an accessory, even though power to the refrigerator is stopped due to power failure, the demagnetization processes can be executed by switching the persistent current switch 2 to the off-state, sweeping the reverse current by the external power supply 5, and switching the circuit by the circuit breaker 6.

The superconducting magnet apparatus 100 can be included, for example, in a magnetic resonance imaging (MRI) apparatus. The MRI apparatus includes a gradient magnetic field coil, an amplifier for a gradient magnetic field, a radio frequency (RF) antenna, an RF transceiver, and the like in addition to a static magnetic field coil, a persistent current switch, and a cryostat. The static magnetic field coil, the persistent current switch, and the cryostat of the MRI apparatus can be formed by the superconducting coils 1, the persistent current switch 2, and the cryostat 3 represented by the equivalent circuit illustrated in FIG. 1.

In the persistent current mode of the MRI apparatus, the static magnetic field coil formed by the superconducting coils 1 generates a strong static magnetic field in a measurement position where a patient is stationary. The higher the strength of the static magnetic field, the higher a nuclear magnetic resonance frequency, and a frequency resolution can be improved. A current that changes with time as necessary is supplied from the amplifier for the gradient magnetic field to the gradient magnetic field coil. The gradient magnetic field coil generates a magnetic field having a spatial distribution in a measurement position where the patient is stationary. The RF antenna applies an oscillating magnetic field of a nuclear magnetic resonance frequency to the measurement position. The RF transceiver receives a resonance signal issued from the measurement position to enable the creation of a tomographic image of a measurement site of the patient.

According to such an MRI apparatus, since the superconducting magnet can be demagnetized more rapidly than in the related art by using the method for demagnetizing the superconducting magnet illustrated in FIG. 2, the operation of the MRI apparatus can be promptly stopped not only at the time of power failure in which power to the refrigerator is stopped or at the time of cooling failure due to malfunction of the refrigerator or the like, but also at the time of an attraction accident in which a device such as equipment in ae diagnosis room or a pacemaker implanted in the patient, an implant, or the like is attracted to the MRI apparatus, or at the time of urgent diagnosis stop.

The superconducting coils 1 and the persistent current switch 2 are preferably made of a superconducting wire material using $MgB_2$ or a high-temperature superconductor. The $MgB_2$ and the high-temperature superconductor have an energy tolerance of about 10 to 10000 times larger than an energy tolerance of niobium titanium of the related art, and can energize a large current with a zero resistance in a wide temperature range. Thus, the risk of quenching can be reduced as compared with a case where the niobium titanium of the related art is used. Examples of the high-temperature superconductor include rare earth-based copper oxides such as YBCO and bismuth-based copper oxides such as BSCCO.

Note that, in the case of the superconducting wire material using the niobium titanium of the related art, the rapid demagnetization by the method for demagnetizing the superconducting magnet illustrated in FIG. 2 is difficult. This is because the superconducting wire material using the niobium titanium has a small energy tolerance of about 1 $kJ \cdot m^{-3}$. According to the document (IEEE Trans. Appl. Supercond. 15 (2005) 1615), heat generation by wire movement reaches about 20 $kJ \cdot m^{-3}$ at the maximum. In the energy tolerance of the superconducting wire material using the niobium titanium, even though the wire movement is sufficiently suppressed by using a resin impregnation treatment or the like, the risk of quenching remains, and rapid fluctuation of the magnetic field during rapid demagnetization becomes a problem.

The superconducting wire material using the niobium titanium of the related art or the like is provided in a structure in which a stabilizer is combined. A stabilizer such as copper is combined in a form of burying a superconducting filament having a multi-core wire structure or in a form of covering an outermost layer of a wire material. Such a superconducting wire material has a problem that it is difficult to suppress a coupling loss inversely proportional to an electrical resistivity since the electrical resistivity decreases. That is, in the superconducting wire material using the niobium titanium of the related art or the like, a trade-off between suppression of quenching and suppression of loss occurs due to the use of the stabilizer.

Here, a resistance at the time of demagnetization of the superconducting magnet apparatus 100 will be considered. In the superconducting magnet apparatus 100, a current $I_c$ flowing through the superconducting coil 1 is expressed by the following Equation (2), where $L_m$ is a combined inductance of the superconducting magnet, and $R_r$ is a combined resistance of the persistent current switch 2 and the external resistance element 4. When the resistance of the persistent current switch 2 is $R_p$ and the resistance of the external resistance element 4 is $R_e$, the combined resistance $R_r$ is expressed by the following Equation (3).

[Math. 2]

$$L_m \frac{dI_c}{dt} = -R_r I_c \qquad (2)$$

[Math. 3]

$$\frac{1}{R_r} = \frac{1}{R_e} + \frac{1}{R_p} \qquad (3)$$

A general MRI apparatus has a combined inductance of about 50 H, and the superconducting magnet is desirably demagnetized to about 0.02 T within several tens of seconds to several minutes at the time of urgent demagnetization. In a case where the superconducting magnet is demagnetized from 1.5 T to 0.02 T, a required time can be expressed as $t_{0.02}=4.32 \, L_m/R_r$. Assuming that the combined inductance $L_m$ is 50 H, the combined resistance $R_r$ is calculated to be 10.8 Ω in a case where the required time $t_{0.02}$ is 20 s, the combined resistance $R_r$ is calculated to be 1.8 Ω in a case where the required time $t_{0.02}$ is 120 s, and the combined resistance $R_r$ is calculated to be 0.06Ω in a case where the required time $t_{0.02}$ is 1 h.

Accordingly, in a case where the general MRI apparatus is assumed, in order to realize a rapid demagnetization time within 3 to 4 minutes as the time required for demagnetizing the superconducting coils 1 to 0.02 T, a combined resistance $R_r$ of at least 1 Ω or more is desirably used as a resistance to attenuate the energy accumulated in the superconducting coils 1. In addition, in order to realize a more rapid demagnetization time within 20 to 30 seconds, a combined resistance $R_r$ of 10 Ω or more is desirably used.

Such a high resistance value of 1 Ω to 10 Ω or more is desirably indicated by the external resistance element 4 alone from the viewpoint of suppressing heat generation inside the cryostat 3. That is, it is desirable that the contribution of the persistent current switch 2 in the off-state to the combined resistance $R_r$ is small and Joule heat due to shunting to the persistent current switch 2 in the off-state is sufficiently suppressed in the demagnetization mode illustrated in FIG. 2C.

From such a viewpoint, a resistance value of the persistent current switch 2 in the off-state is preferably times or more a resistance value of the external resistance element 4. Specifically, the resistance value of the persistent current switch 2 in the off-state is preferably 100 Ω or more and 1000 Ω or less. The resistance value of the external resistance element 4 is preferably 1Ω or more and 100 Ω or less, and more preferably 10 Ω or more and 100 Ω or less.

In the demagnetization mode illustrated in FIG. 2C, the current flowing through the superconducting coils 1 is shunt to the external resistance element 4 and the persistent current switch 2 in the off-state. A current ratio between the external resistance element 4 and the persistent current switch 2 is $R_e^{-1}:R_p^{-1}$. With such a resistance value, since the shunting of the current to the persistent current switch 2 can be suppressed in the off-state within a practical range of a wire diameter, a wire length, and a resistance of the superconducting wire material and a practical range of the resistance of the external resistance element 4, the temperature rise inside the cryostat 3 due to Joule heat can be suppressed.

Figure 3:
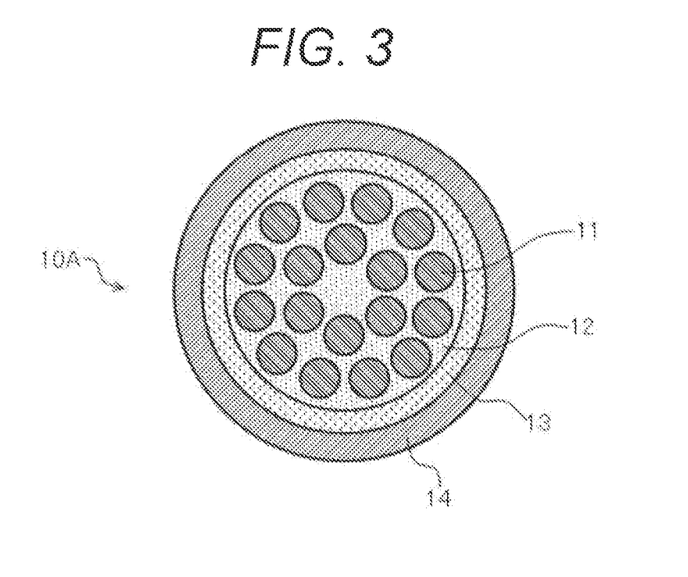
FIG. 3 is a cross-sectional view schematically illustrating an example of a superconducting wire material for a superconducting coil.

FIG. 3 is a cross-sectional view schematically illustrating an example of the superconducting wire material for a superconducting coil.

As illustrated in FIG. 3, a superconducting wire material 10A provided in a multi-core wire structure having a plurality of superconducting filaments is preferably used as the superconducting wire material for a superconducting coil forming the superconducting coil 1. FIG. 3 illustrates an example of the superconducting wire material for a superconducting coil using the $MgB_2$.

The superconducting wire material 10A for a superconducting coil includes a plurality of superconducting filaments 11, a base material 12 for burying and covering the plurality of superconducting filaments 11, an intermediate material 13 for covering an outer periphery of the base material 12, and a stabilizer 14 for covering an outer periphery of the intermediate material 13.

The superconducting filament 11 is made of $MgB_2$ which is a superconductor. The superconducting filament 11 of $MgB_2$ is formed by a powder-in-tube (PIT) method. The PIT method is a method for forming the superconducting filament by filling a raw material powder of the superconductor in a metal tube, performing wire drawing processing on the metal tube, and then performing heat treatment for reaction sintering or self-sintering. Since the PIT method is used, most of the base material 12 is formed by a metal tube (not illustrated) storing the superconducting filament 11.

A method for producing the superconducting wire material using the $MgB_2$ is roughly divided into an in-situ method and an ex-situ method. The in-situ method is a method for filling a mixed powder of magnesium and boron in a metal tube and forming the superconducting filament of $MgB_2$ by reaction sintering by heat treatment. The ex-situ method is a method for filling a powder of $MgB_2$ in a metal tube and forming the superconducting filament of $MgB_2$ formed by self-sintering by heat treatment. Either an in-situ method or an ex-situ method may be used as a method for forming the superconducting filament 11 of $MgB_2$.

The base material 12 buries and covers the plurality of superconducting filaments 11, and extends over a length direction of the superconducting wire material 10A to cover an outer periphery of each superconducting filament 11 and an outer periphery of a core of the multi-core wire structure. Most of the base material 12 is made of a metal tube which is a barrier material, but a center material or the like may be used in addition to the metal tube. At the time of heat treatment for producing $MgB_2$, a barrier material prevents reaction between Mg or B which is a raw material of $MgB_2$, and an inhibitor such as copper which hinders the production of $MgB_2$.

The base material 12 can be made of iron (Fe), niobium (Nb), tantalum (Ta), titanium (Ti), an alloy thereof, or the like. Since these metals hardly react with Mg or B, the superconducting filament 11 of $MgB_2$ can be formed without hindering the production of $MgB_2$. A material of the base material 12 is preferably iron or niobium. Since iron and niobium have good processability and are relatively inexpensive, a wire material on which wire drawing processing is performed can be obtained at low cost.

The intermediate material 13 is provided to cover the outer periphery of the base material 12 over the length direction of the superconducting wire material 10A. The intermediate material 13 is made of a material having a higher electrical resistivity than the base material 12 and the stabilizer 14, and is disposed between the base material 12 and the stabilizer 14. In a case where the intermediate material is made of such a material having a high resistivity, since exudation of a coupling current (shielding current) to the stabilizer 14 is suppressed, a coupling loss can be reduced, and the amount of generated heat inside the cryostat 3 can be suppressed.

The intermediate material 13 can be made of stainless steel, a nickel-copper alloy, or the like. Examples of the stainless steel include austenitic stainless steel such as SUS316L, SUS316, SUS304, and SUS301. Examples of the nickel-copper alloy include Monel 400 and cupronickel. Since these metals have high resistivity, high strength, and high hardness, it is possible to reduce the coupling loss, and it is possible to suppress a disturbance of a shape at the time of the wire drawing processing.

The stabilizer 14 is provided to cover the outer periphery of the intermediate material 13 over the length direction of the superconducting wire material 10A. The stabilizer 14 is made of a good conductor having a lower electrical resistivity and a higher thermal conductivity than the base material 12 and the intermediate material 13, and is disposed outside the intermediate material 13. The stabilizer 14 thermally stabilizes the superconductive state of the superconducting filament 11 to suppress quenching and thermal runaway of the superconductor. The stabilizer 14 is preferably made of copper, and more preferably made of high purity copper of 3 N or more.

In FIG. 3, the stabilizer 14 constitutes an outermost layer of the superconducting wire material 10A, but may include a stabilizing member provided in a portal shape or the like in cross-sectional view instead of the stabilizer 14 or together with the stabilizer 14. The stabilizing member provided in the portal shape or the like in cross-sectional view can be added by a method such as a wire-in-channel method after the superconducting wire material 10A is manufactured. In a case where the outer periphery of the superconducting wire material 10A is covered with the stabilizing member, since thermal stabilization and reduction of wire movement can be achieved, quenching and thermal runaway of the superconductor can be suppressed.

According to the superconducting wire material 10A for a superconducting coil, since the superconducting wire material is provided in the multi-core wire structure, the superconducting filament 11 is appropriately formed in response to a demand for a high current density, and stable energization characteristics can be obtained. A superconducting wire material using a rare earth-based copper oxide of the related art has a tape-shaped single-core wire structure as a mainstream, and tends to have a large hysteresis loss. In addition, a superconducting wire material using a bismuth-based copper oxide of the related art has a multi-core wire structure, but tends to have a large coupling loss. In contrast, according to the superconducting wire material 10A for a superconducting coil, since the intermediate material 13 having an electrical resistivity higher than the base material 12 and the stabilizer 14 is provided, the coupling loss is reduced, and quenching is less likely to occur. Thus, in the method for demagnetizing the superconducting magnet illustrated in FIG. 2, it is possible to realize rapid demagnetization by suppressing the amount of generated heat inside the cryostat 3.

The superconducting wire material 10A for a superconducting coil is preferably provided in a stranded structure in which the pluralities of superconducting filaments 11 are spirally twisted. In a case where the superconducting wire material for a superconducting coil is provided in the stranded structure, electromagnetic stability can be improved to reduce loss. A twist pitch of the stranded structure is not particularly limited, but may be, for example, 10 mm to 300 mm.

Figure 4:
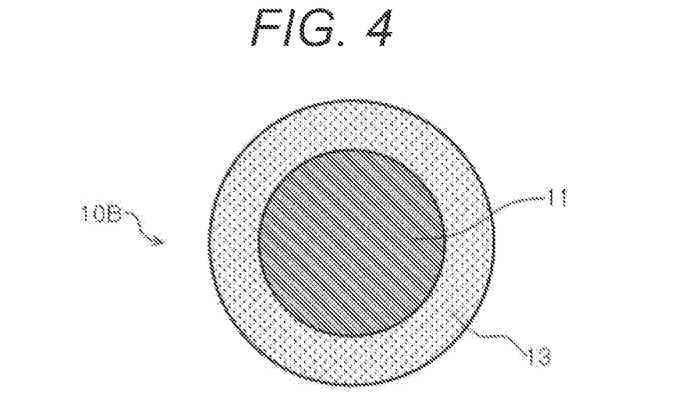
FIG. 4 is a cross-sectional view schematically illustrating an example of a superconducting wire material for a persistent current switch.

FIG. 4 is a cross-sectional view schematically illustrating an example of the superconducting wire material for a persistent current switch.

As illustrated in FIG. 4, a superconducting wire material 10B provided in a single-core wire structure having a single superconducting filament is preferably used as the superconducting wire material for a persistent current switch forming the persistent current switch 2. FIG. 4 illustrates an example of a superconducting wire material for a persistent current switch using $MgB_2$.

The superconducting wire material 10B for a persistent current switch includes a superconducting filament 11 and a base material 12 covering an outer periphery of the superconducting filament 11.

The superconducting filament 11 is made of $MgB_2$ which is a superconductor. The superconducting filament 11 of $MgB_2$ is formed by a powder-in-tube (PIT) method. Either an in-situ method or an ex-situ method may be used as a method for forming the superconducting filament 11 of $MgB_2$.

In the superconducting wire material 10B for a persistent current switch, a carbon source as an impurity may be added to $MgB_2$ in the superconducting filament 11. In a case where the carbon source is added to the powder as a raw material of $MgB_2$, a part of a honeycomb lattice of boron in a crystal of $MgB_2$ can be substituted with carbon during heat treatment. In a case where substitution with a different element is performed, since periodicity of an atomic arrangement is disturbed, a residual resistance of the superconducting filament 11 itself can be increased to increase an off-resistance of the persistent current switch 2.

Examples of the carbon source include hydrocarbons such as coronene, benzene, naphthalene, and anthracene, organic acids such as stearic acid, magnesium salts of organic acids, and inorganic carbon compounds such as $B_4C$ and SiC. The addition amount of the carbon source is preferably 2 mass % to 3 mass % per raw material of the superconducting filament. With such an addition amount, it is possible to sufficiently obtain an effect of increasing the residual resistance while a high critical current is secured.

The base material 12 covers an outer periphery of the superconducting filament 11 over a length direction of the superconducting wire material 10B. The base material 12 is formed by a metal tube as a barrier material. The base material 12 can be made of iron (Fe), niobium (Nb), tantalum (Ta), titanium (Ti), an alloy thereof, or the like. A material of the base material 12 is preferably a niobium-titanium alloy or stainless steel. In pure metal, impurity scattering hardly occurs. In addition, phonon scattering hardly occurs at an extremely low temperature equal to or lower than a critical temperature. In contrast, in a case where these alloys are used, the off-resistance of the persistent current switch 2 can be effectively increased by impurity scattering.

According to the superconducting wire material 10B for a persistent current switch, the superconducting wire material is provided in the single-core wire structure, it is suitable for thinning as compared with the case of the multi-core wire structure, and is advantageous for increasing the off-resistance of the persistent current switch 2. In the method for demagnetizing the superconducting magnet illustrated in FIG. 2, since it is possible to suppress the shunting to the persistent current switch 2 in the off-state during the execution of the demagnetization mode, it is possible to realize rapid demagnetization by suppressing the amount of generated heat inside the cryostat 3.

The superconducting wire material 10B for a persistent current switch is installed at a place where a maximum experience magnetic field is lower than the superconducting wire material 10A for a superconducting coil. The superconducting wire material forming the persistent current switch 2 usually has a maximum experience magnetic field of 1 T or less, and is in a state where a critical current density exhibiting magnetic field dependence is hardly reduced. In the superconducting wire material forming the persistent current switch 2, since a high critical current density is easily obtained as compared with the superconducting wire material forming the superconducting coil, and this case means that significant thinning can be performed within a range in which a required operation current can flow.

For this reason, a wire diameter of the superconducting wire material 10B for a persistent current switch forming the persistent current switch 2 is preferably smaller than a wire diameter of the superconducting wire material 10A for a superconducting coil forming the superconducting coil 1. In a case where the superconducting wire material forming the persistent current switch 2 is thinned, the off-resistance of the persistent current switch 2 can be increased without extremely increasing a wire length.

Specifically, the wire diameter of the superconducting wire material 10A for a superconducting coil is preferably 1.0 mm or more and 2.5 mm or less, and more preferably 1.0 mm or more and 2.0 mm or less, from the viewpoint of flowing an operation current at a high current density, from the viewpoint of reducing the risk of breakage due to an external force, and the like.

The wire diameter of the superconducting wire material 10B for a persistent current switch is preferably 0.4 mm or more and less than 1.0 mm, more preferably 0.4 mm or more and 0.75 mm or less, still more preferably 0.4 mm or more and 0.5 mm or less from the viewpoint of thinning the wire while a high current density is secured.

For example, at 40 K, a resistivity of $MgB_2$ is about 30 $\mu\Omega \cdot cm$, a resistivity of niobium titanium is about 60 $\mu\Omega \cdot cm$, and a resistivity of stainless steel (SUS316L) is about 45 $\mu\Omega \cdot cm$. Thus, assuming that the wire diameter of the superconducting wire material 10B for a persistent current switch is 0.5 mm, in a case where a composite resistivity combined for each material is 40 $\mu\Omega \cdot cm$, a resistance per unit length is $2\Omega \cdot m^{-1}$.

In a case where the superconducting wire material having such electric resistance is used, in order to set a resistance value of the persistent current switch 2 in an off-state to 100 $\Omega$ or more, a wire length of the superconducting wire material 10B for a persistent current switch is preferably set to 50 m or more. In addition, in order to set the resistance value in the off-state to 1000$\Omega$ or less, the wire length is preferably set to 500 m or less.

In the superconducting wire material using the niobium titanium of the related art, a high resistivity material such as a copper-nickel alloy is generally used as a base material. In a case where such a high resistivity material is used, thermal stability is lowered, and the risk of quenching is increased. Thus, in a case where the persistent current switch is formed by the superconducting wire material using the niobium titanium of the related art, an allowable amount of current must be secured by increasing the wire diameter.

However, in a case where the wire diameter of the superconducting wire material forming the persistent current switch is increased, and a required wire length becomes long in a case where the off-resistance of the persistent current switch is increased, and several kilometers are required in some cases. In addition, since a heat capacity of the superconducting wire material increases, the required amount of input heat increases when the thermal persistent current switch is switched to the off-state, and is disadvantageous from the viewpoint of suppressing the temperature rise inside the cryostat.

In contrast, as the wire diameter of the superconducting wire material 10B for a persistent current switch forming the persistent current switch 2 is smaller than the wire diameter of the superconducting wire material for a superconducting coil forming the superconducting coil 1, the wire length of the superconducting wire material for a persistent current switch can be shortened to a realistic range in increasing the off-resistance. When the thermal persistent current switch 2 is switched to the off-state, since the required amount of input heat is reduced, the temperature rise inside the cryostat 3 is suppressed to prevent quenching, and heat generation due to Joule heat can also be suppressed.

The electrical resistance of the superconducting wire material 10B for a persistent current switch forming the persistent current switch 2 is preferably higher than the electrical resistance of the superconducting wire material using the existing niobium titanium. The off-resistance of the persistent current switch formed by the superconducting wire material using the niobium titanium of the related art is about several $\Omega$ to several tens $\Omega$. In the superconducting magnet apparatus of the related art, when the superconducting magnet is demagnetized, a method for heating the superconducting coil or the like to forcibly quench the superconducting coil without performing rapid current sweep is used. In a case where the electric resistance is higher than such a superconducting wire material, thinning can be performed without increasing the risk of quenching.

Figure 5:
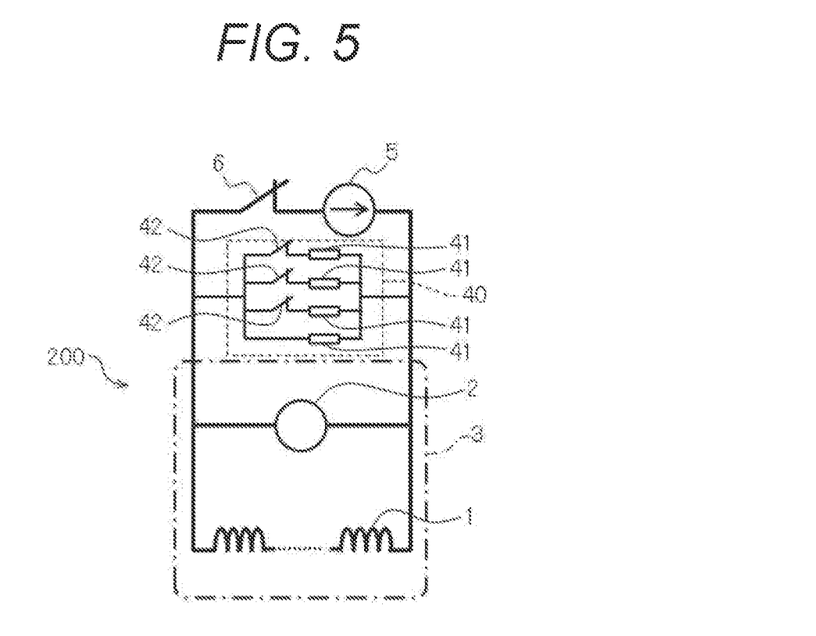
FIG. 5 is a diagram illustrating an equivalent circuit of a superconducting magnet apparatus according to a modification example of the present invention.

FIG. 5 is a diagram illustrating an equivalent circuit of a superconducting magnet apparatus according to a modification example of the present invention.

As illustrated in FIG. 5, the superconducting magnet apparatus to which the method for demagnetizing the superconducting magnet illustrated in FIG. 2 is applied can have a form according to a modification example including a variable resistance element. A superconducting magnet apparatus 200 according to the modification example is a device that generates a magnetic field by a superconducting magnet, and includes superconducting coils 1, a persistent current switch 2, a cryostat 3, a variable resistance element 40, an external power supply 5, and a circuit breaker 6.

The variable resistance element 40 is a resistance element that attenuates energy accumulated in the superconducting coils, and is provided such that a total resistance value can be changed. The variable resistance element 40 includes a plurality of resistance elements 41 and a plurality of circuit breakers 42. The variable resistance element 40 is connected in parallel with the superconducting coil 1 and is disposed outside the cryostat 3. The variable resistance element 40 can be provided to change the total resistance value automatically or manually.

The resistance element 41 is a resistance element that converts electric energy into thermal energy, and attenuates energy accumulated in the superconducting coils 1 in a case where the superconducting coils 1 are demagnetized. The resistance elements 41 are connected in parallel to each other between both terminals of the variable resistance element 40. A solid resistor using metal or the like, a liquid resistor using a conductive liquid, or the like can be used as the resistance elements 41. The plurality of resistance elements 41 may be provided as the identical resistance value, or may be provided as different resistance values.

The circuit breaker 42 is a device that opens and closes a current circuit, and can freely cut off energization between each resistance element 41 and the superconducting coil 1. The circuit breaker 42 is connected in series with each resistance element 41. Various types such as a vacuum circuit breaker, a pneumatic circuit breaker, an oil-filled circuit breaker, and a gas circuit breaker can be used as the circuit breaker 42. Note that, as illustrated in FIG. 5, the circuit breaker 42 may not be connected to the resistance element 41 that is not used to increase or decrease the total resistance value and is used as a basic resistance among the plurality of resistance elements 41 connected in parallel to each other.

In the variable resistance element 40, a combined resistance value of the plurality of resistance elements 41 is changed by opening and closing the plurality of circuit breakers 42. According to the variable resistance element 40, when the superconducting coils 1 are demagnetized, a rate of attenuating the energy accumulated in the superconducting coils 1 can be adjusted by changing the combined resistance value in accordance with a required demagnetization rate.

The combined resistance value of the variable resistance element 40 is preferably changed within a range of a resistance value smaller than the off-resistance of the persistent current switch 2. The combined resistance value of the variable resistance element 40 may be changed for each demagnetization process in accordance with the reason for performing the demagnetization measure, or may be changed during one demagnetization process in accordance with a change in the amount of current or a voltage of the persistent current switch 2 or the like.

For example, in a case where there is no time margin and a required demagnetization rate is fast, such as in an attraction accident in which a magnetic body is attracted to the superconducting magnet apparatus, the total resistance value is preferably increased by bringing each circuit breaker 42 to a closed state. On the other hand, in a case where there is a time margin and a required demagnetization rate is slow, such as a case where power to the refrigerator is stopped or a case where cooling cannot be performed due to an operation failure or the like of the refrigerator, the total resistance value is preferably decreased by bringing the predetermined circuit breaker 42 to an opened state.

In a case where the rate of attenuating the energy accumulated in the superconducting coils 1 is set to be slow and the demagnetization rate of the superconducting coil 1 is suppressed by such a variable resistance element 40, since it is possible to reduce a loss in the superconducting coil 1 and the Joule heat due to shunting to the persistent current switch 2, the amount of generated heat inside the cryostat 3 can be suppressed.

In addition, in a case where a time rate of change in the amount of current flowing through the superconducting coil 1 is large and a large voltage is applied between both terminals of the superconducting coil 1 as at the start of the demagnetization process, the total resistance value is preferably decreased by bringing each circuit breaker 42 to an opened state. On the other hand, in a case where the time rate of change in the amount of current flowing through the superconducting coil 1 is small and a large voltage is not applied between both terminals of the superconducting coil 1 as in the execution of the demagnetization process, the total resistance value is preferably increased by bringing the predetermined circuit breaker 42 to a closed state.

In a case where the total resistance value is increased in accordance with a time change of the amount of current by such a variable resistance element 40, the time change of the amount of current flowing through the superconducting coil 1 or the persistent current switch 2 can be suppressed. Usually, the amount of current during demagnetization changes exponentially with time, but since a voltage between both terminals of the superconducting coil 1 and the persistent current switch 2 can be suppressed to be small, the demagnetization process can be stably advanced while the amount of generated heat inside the cryostat 3 is suppressed.

According to the superconducting magnet apparatus, the magnetic resonance imaging apparatus, and the method for demagnetizing the superconducting magnet described above, when the superconducting magnet is demagnetized, since the reverse current of the persistent current is caused to flow from the external power supply to the superconducting coils, the persistent current switch and the circuit breaker are switched to the off-state, and the current flowing through the superconducting coil is caused to flow to the external resistance element to be attenuated, it is possible to suppress the current shunt to the persistent current switch to the allowable amount of current or less by appropriate design of the superconducting wire material forming the persistent current switch 2 and the external power supply 5.

In the superconducting magnet apparatus of the related art that performs cooling with liquid helium, when the superconducting magnet is demagnetized, since the liquid helium filled in the cryostat continues to cool the superconducting coils and the like, the temperature rise inside the cryostat is suppressed, and early restoration after demagnetization can be performed, but the cost of the liquid helium has been increased. In addition, in a superconducting magnet apparatus not using liquid helium or a superconducting magnet apparatus with a small filling amount of liquid helium, it takes time to re-cool the superconducting coils after demagnetization.

In addition, in a case where the external power supply that causes the reverse current of the persistent current to flow to the superconducting coils is not provided, it is possible to demagnetize the superconducting magnet by causing the current flowing to the superconducting coils to flow to the external resistance element after the persistent current switch is switched to the off-state, but, in this demagnetization method, there is a high risk that the superconducting wire material forming the persistent current switch burns out. Even in the superconducting wire material using $MgB_2$ or a high-temperature superconductor, since a propagation speed in a normal conduction region is slow, in a case where heating is locally performed, there is a risk that Joule heat is concentrated in a small normal conduction region. In addition, the off-resistance of the persistent current switch was not sufficiently high, and Joule heat due to shunting to the persistent current switch 2 was concentrated.

In contrast, according to the superconducting magnet apparatus, the magnetic resonance imaging apparatus, and the method for demagnetizing the superconducting magnet, the current shunt to the persistent current switch can be suppressed to be small by sweeping the reverse current by the external power supply and attenuating the energy by the external resistance element disposed outside the cryostat. The energy accumulated in the superconducting coils 1 is converted into thermal energy by the external resistance element 4 disposed outside the cryostat 3. In addition, rapid fluctuation of the magnetic field in the superconducting coils 1 and the persistent current switch 2 is suppressed. Thus, the amount of generated heat inside the cryostat 3 can be suppressed, and the superconducting magnet can be rapidly demagnetized. Since the temperature rise of the superconducting coil 1 and the persistent current switch 2 is suppressed to be small, the time required for restoration of the device can be shortened.

Although the embodiment of the present invention has been specifically described, the present invention is not limited to the above-described embodiment, and various changes can be made without departing from the scope of the present invention. For example, the present invention is not necessarily limited to the embodiment including all the configurations included in the above-described embodiment. A part of the configuration of a certain embodiment can be replaced with another configuration, a part of the configuration of a certain embodiment can be added to another form, or a part of the configuration of a certain embodiment can be omitted.

REFERENCE SIGNS LIST 1 superconducting coil
2 persistent current switch
3 cryostat
4 external resistance element
5 external power supply
10A superconducting wire material for superconducting coil
10B superconducting wire material for persistent current switch
11 superconducting filament
12 base material
13 intermediate material
14 stabilizer
40 variable resistance element
41 resistance element
42 circuit breaker

The invention claimed is:

1. A superconducting magnet apparatus comprising:
a superconducting coil that forms a superconducting magnet;
a persistent current switch that forms a closed circuit in which a persistent current flows together with the superconducting coil;
a cryostat that houses the superconducting coil and the persistent current switch;
an external resistance element that is connected in parallel with the superconducting coil, is disposed outside the cryostat, and attenuates energy accumulated in the superconducting coil when the superconducting coil is demagnetized;
an external power supply that is connected in parallel with the superconducting coil, is disposed outside the cryostat, and is able to energize a reverse current of the persistent current to the closed circuit;
a circuit breaker that is connected in series with the power supply, and is able to freely cut off energization between the external power supply and the superconducting coil; and
circuitry configured to:
when the superconducting magnet is to be demagnetized, control the external power supply to cause the reverse current of the persistent current to flow from the external power supply to the closed circuit; and
when an amount of current flowing through the persistent current switch is detected to have decreased, control the persistent current switch to be switched to an off-state and control the circuit breaker to be switched to an off-state, and wherein the superconducting magnet is demagnetized by causing a current flowing through the superconducting coil to flow to the external resistance element in a closed circuit formed by the superconducting coil and the external resistance element.

2. The superconducting magnet apparatus according to claim 1, wherein the superconducting coil and the persistent current switch are formed by a superconducting wire material including a superconducting filament formed by magnesium diboride or a high-temperature superconductor.

3. The superconducting magnet apparatus according to claim 1, further comprising an uninterruptible power supply device configured to supply power to the persistent current switch, the external power supply, and the circuit breaker.

4. The superconducting magnet apparatus according to claim 1, wherein
the superconducting coil is made of a superconducting wire material provided in a stranded structure in which a plurality of superconducting filaments are spirally twisted,
the superconducting wire material includes the plurality of superconducting filaments, a base material that buries and covers the plurality of superconducting filaments, an intermediate material that covers an outer periphery of the base material, and a stabilizer that covers an outer periphery of the intermediate material,
the superconducting filament is made of magnesium diboride, and
the intermediate material has a higher electrical resistivity than the base material.

5. The superconducting magnet apparatus according to claim 4, wherein
the base material is iron or niobium,
the intermediate material is stainless steel or a nickel-copper alloy, and
the stabilizer is copper.

6. The superconducting magnet apparatus according to claim 1, wherein a resistance value of the external resistance element is 1Ω or more.

7. The superconducting magnet apparatus according to claim 1, wherein a resistance value of the persistent current switch in an off-state is 10 times or more a resistance value of the external resistance element.

8. The superconducting magnet apparatus according to claim 1, wherein
the persistent current switch includes a superconducting filament, and a base material that covers an outer periphery of the superconducting filament,
the superconducting filament is made of magnesium diboride, and
the base material is a niobium-titanium alloy or stainless steel.

9. The superconducting magnet apparatus according to claim 1, wherein the external resistance element is a variable resistance element that is able to change a total resistance value.

10. The superconducting magnet apparatus according to claim 9, wherein
the external resistance element includes
a plurality of resistance elements connected in parallel to each other, and
a plurality of circuit breakers connected in series with the plurality of resistance elements, and is able to freely cut off energization between the external resistance element and the superconducting coil, and
a combined resistance value of the resistance elements is changed by opening and closing the circuit breaker.

11. A magnetic resonance imaging apparatus comprising the superconducting magnet apparatus according to claim 1.

12. A method for demagnetizing a superconducting magnet operated in a persistent current mode, comprising: in a superconducting magnet that includes a superconducting coil forming a superconducting magnet, a persistent current switch forming a closed circuit in which a persistent current flows together with the superconducting coil, a cryostat housing the superconducting coil and the persistent current switch, an external resistance element connected in parallel with the superconducting coil, disposed outside the cryostat, and attenuating energy accumulated in the superconducting coil when the superconducting coil is demagnetized, an external power supply connected in parallel with the superconducting coil, disposed outside the cryostat, and able to energize a reverse current of the persistent current to the closed circuit, and a circuit breaker connected in series with the power supply, and capable of freely cut off energization between the external power supply and the superconducting coil,
causing the reverse current of the persistent current to flow from the external power supply to the closed circuit when the superconducting magnet is to be demagnetized; and
switching the persistent current switch to an off-state and switching the circuit breaker to an off-state, and demagnetizing the superconducting magnet by causing a current flowing through the superconducting coil to flow to the external resistance element in a closed circuit formed by the superconducting coil and the external resistance element, when an amount of current flowing through the persistent current switch decreases.

* * * * *